United States Patent
Bruton et al.

[15] 3,650,288
[45] Mar. 21, 1972

[54] SAFETY RELIEF VALVE

[72] Inventors: Billy R. Bruton; Joe B. Locke, both of Longview, Tex.

[73] Assignee: U.S. Industries, Inc., New York, N.Y.

[22] Filed: Feb. 5, 1970

[21] Appl. No.: 8,812

[52] U.S. Cl. ..........................................137/219
[51] Int. Cl. ...............................F16k 1/06, F16k 1/12
[58] Field of Search................137/219, 220, 221, 222, 491

[56] References Cited

UNITED STATES PATENTS

| 845,063 | 2/1907 | Desper..............................137/219 |
| 2,878,828 | 3/1959 | Johnson et al....................137/219 |
| 582,445 | 5/1897 | Tippett.............................137/491 |
| 1,736,938 | 11/1929 | Price................................137/220 |
| 2,704,547 | 3/1955 | Fox..................................137/219 |
| 3,004,553 | 10/1961 | Chatfield et al...............137/219 X |
| 3,172,420 | 3/1965 | Brown et al.....................137/219 |
| 3,359,997 | 12/1967 | Gardey............................137/219 |

FOREIGN PATENTS OR APPLICATIONS

| 110,905 | 5/1964 | Czechoslovakia...............137/219 |
| 560,763 | 7/1923 | France............................137/219 |

*Primary Examiner*—Henry T. Klinksiek
*Attorney*—Hyer, Eickenroht, Thompson & Turner

[57] ABSTRACT

A safety relief valve comprises an outer annular body with a relief port through one end, an outlet at the other end, and an annular seat about the relief port. An inner body having ribs extending outwardly therefrom is removably insertable through the outlet into a position within the outer body in which the ribs are seated therein to support the inner body generally concentrically within and spaced from the outer body to provide an annular flow passage between the inner and outer bodies. The end of the inner body facing the relief port is spaced from the seat to provide an annular opening connecting the flow passages, and a closure member is mounted on the inner body for reciprocation between a position seated on the seat to close communication between the flow passages and a position spaced from the seat to open communication therebetween.

8 Claims, 5 Drawing Figures

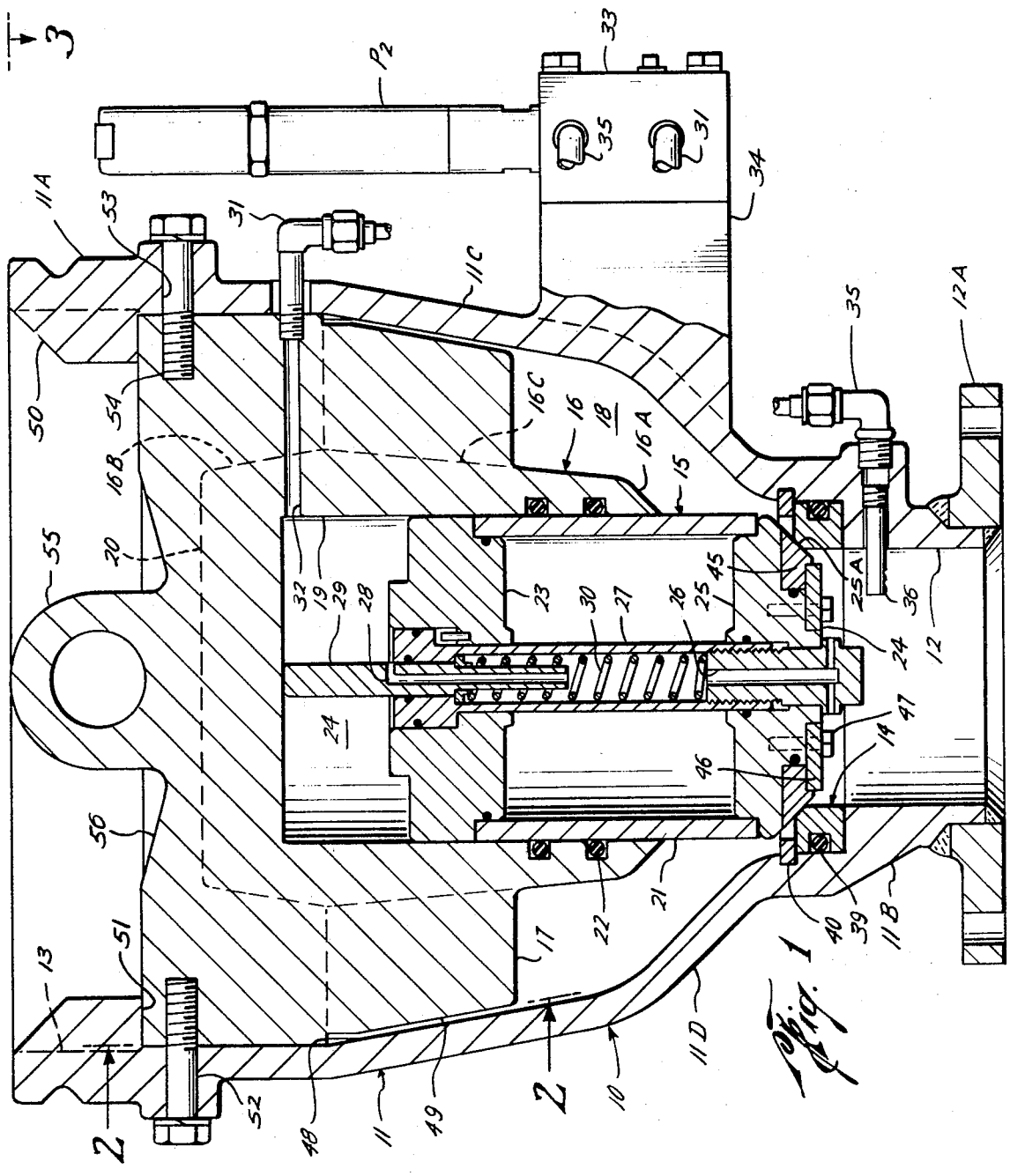

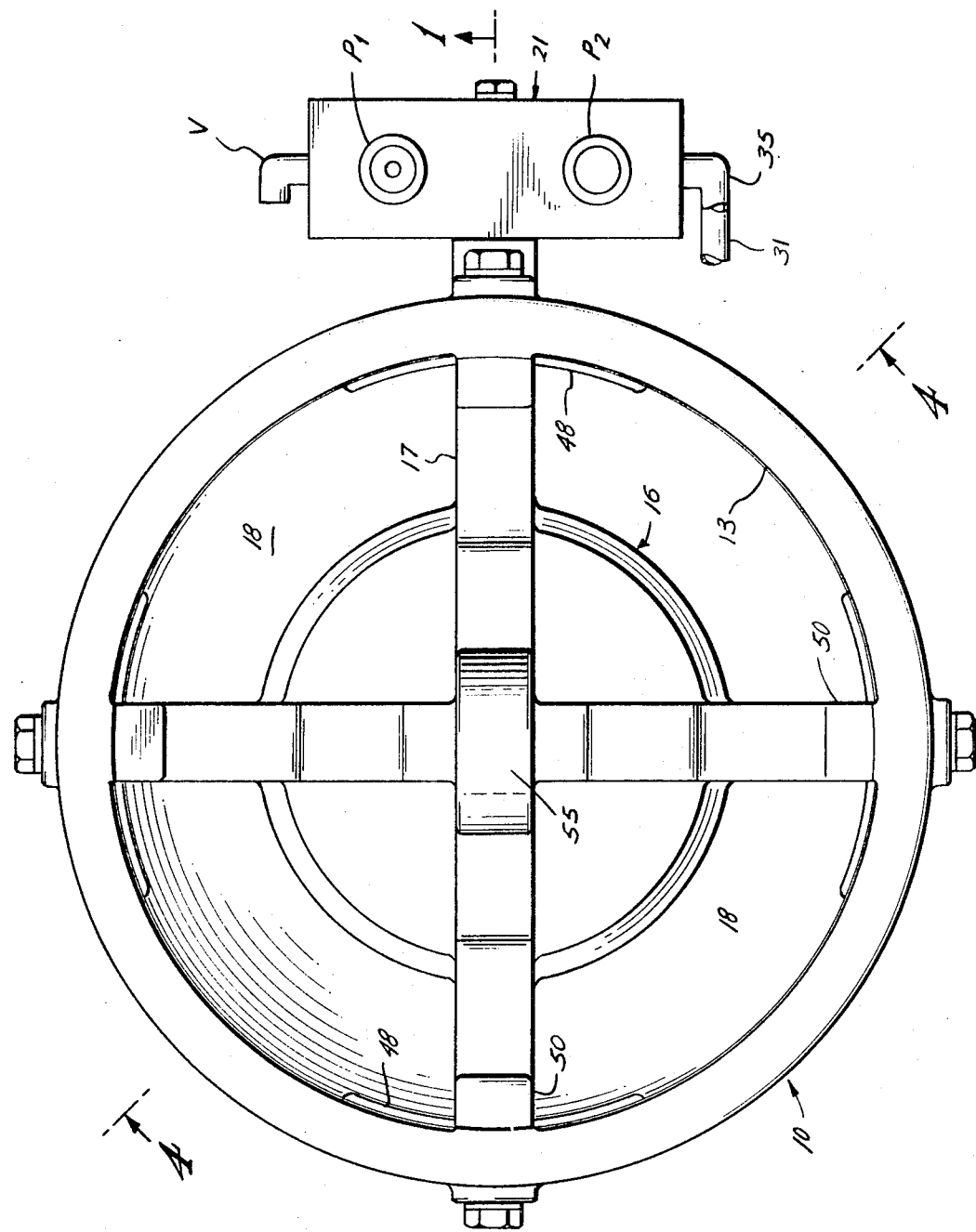

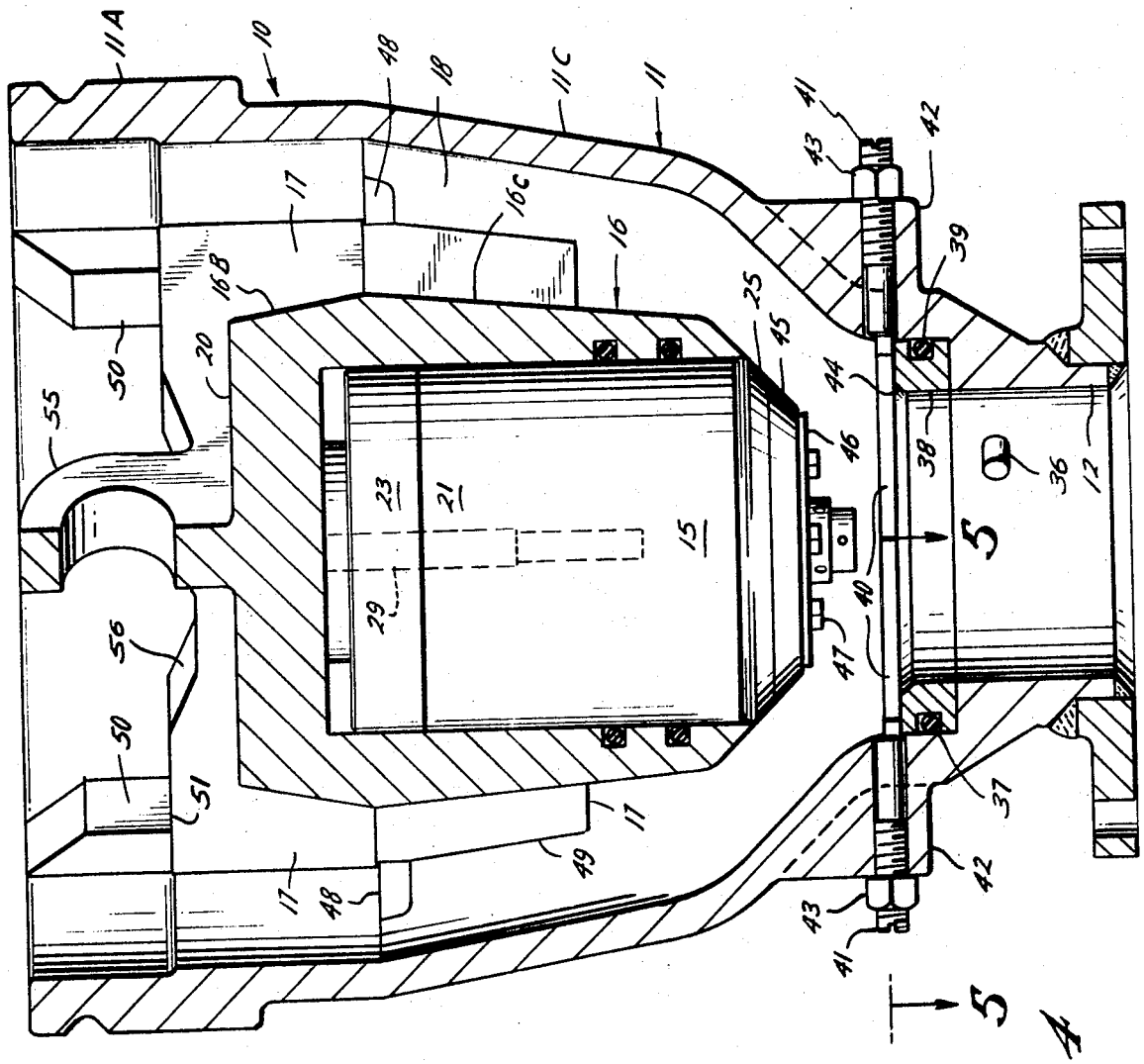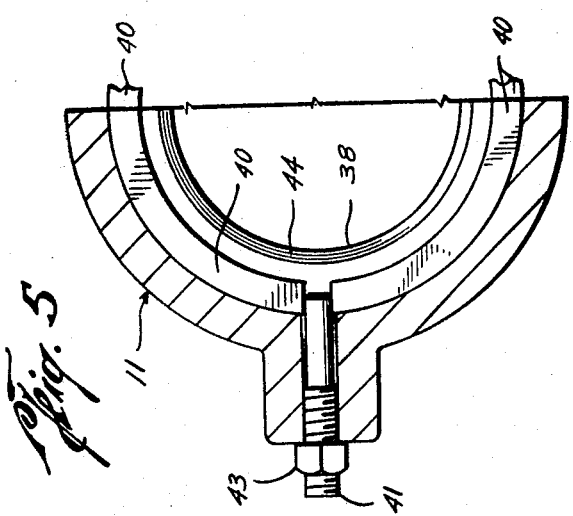

SAFETY RELIEF VALVE

This invention relates to valves of the type which are adapted to relieve high pressure gases to atmosphere through a vertical stack. More particularly, it relates to improvements in the valve shown and described in copending U.S. patent application, executed on the same date as the present application, by Joe B. Locke, entitled "Safety Relief Valve," and assigned to the assignee of the present application.

As noted in said copending application, prior valves of this type, such as the one shown and described in U.S. Pat. No. 2,759,488, have comprised a body having a relief port adapted for connection to an outlet from a pressure vessel, a seat about the flow passage through the relief port, one or more outlets from the side of the body, and a closure member reciprocable between opened and closed positions with respect to the seat for controlling communication between the flow passage through the relief port with the flow passage through each outlet from the valve. More particularly, in such prior valves, the closure member of such prior valves includes a piston reciprocable within a cylinder in the inner body to provide a pressure chamber between the piston and the head of the cylinder on the end of the body opposite the relief port. As also shown in U.S. Pat. No. 2,759,488, pilots are mounted on the cylinder head for alternately venting the chamber so as to cause the closure member to open and pressurizing the chamber so as to cause said member to close in response to predetermined high and low pressures, respectively, in the vessel.

However, as also noted in said copending application, in areas in which surrounding persons or objects must be protected, prior valves of this type have also included an exhaust assembly comprising an elbow having one end connected to each side outlet from the body, and a vertical stack connected to the other end of the elbow so as to direct high pressure exhaust gas in a vertical direction. Although a relief valve having only one side outlet minimizes the cost of materials and labor due to this exhaust assembly, it nevertheless creates unbalanced forces on the valve due to side thrust in only one direction. On the other hand, although this side thrust may be balanced to some extent by a valve of this type having dual outlets, the cost of the exhaust assembly is considerably increased. These and other problems are overcome by the valve shown and described in the said copending application, wherein the relieved gas is caused to pass from the relief port to the outlet through an annular flow passage formed in the body of the valve itself, thereby eliminating the need for separate elbows and stacks and providing unrestricted flow of the relieved gas about the entire circumference of the seat about the relief port.

However, the piston of the closure member of the valve shown and described in said copending application has a larger effective cross-sectional area of the seat which the closure member engages, so that gas pressure within the relief port which is admitted to the chamber normally holds it in seated position. Thus, the closure member must be removed from within the cylinder in the inner body facing the outlet. In some cases, the seat ring may also be passed through the cylinder upon removal of the bonnet, although when the outside diameter of the seat ring is greater than that of the piston of the closure member, a separate liner of greater outside diameter than the seat must be installed in the cylinder.

Obviously, removable bonnets and liners of this type require seals, retainers and precise machining which increase the cost of the valve of the type shown and described in the copending application, and it is therefore an object of this invention to provide such a valve in which the closure member and seat may be removed without such a removable bonnet, much less a removable bonnet and liner.

A further object is to provide such a valve which requires a minimum amount of machining and a minimum number of seals.

Another object is to provide such a valve in which many of the parts may be cast at relatively small expense.

These and other objects are accomplished, in accordance with the illustrated embodiment of the present invention, by a valve in which the inner body is removable through the outlet of the outer body, and, more particularly, in which the ribs extend from the inner body to seat on the inner side of the outer body and thereby support the inner body within the outer body. In this manner, both the seat ring and the closure member may be removed merely upon removal of the inner body from within the outer body, so that the cylinder head on the end of the inner body facing the outlet may be integral with the cylinder. Furthermore, the cylinder may be removed regardless of its size relative to that of the piston on the closure member, so that the valve is extremely simplified in that it requires no removable bonnet or liner, or the seals, retainers and precision machining which they require. Also, the construction of the inner body separately of the outer body simplifies the casting of parts for the valve and thus reduces its overall cost.

In the preferred embodiment of the invention, the inner body is secured in seated position within the outer body by means of lugs on the inner side of the outer body engageable with bearing surfaces on the ends of the ribs. For this purpose, the lugs are circumferentially spaced apart to permit the ribs to be passed between them as the inner body is inserted into the outer body and then rotated into positions to dispose the bearing surfaces on the ribs beneath the lugs. When the ribs are so seated, bearing surfaces on their opposite ends engage with annular shoulders about the inner side of the outer body, with the bearing surfaces on both ends of the ribs and the shoulder with which they engage being perpendicular to the annular flow passage between the inner and outer bodies.

It is also preferred that pins be mounted on the outer body for radial movement into and out of the interior of the outer body, and that holes be provided in the ribs to receive the inner ends of the pins when the ribs are in their secured positions. In this way, the ribs and thus the inner body are prevented from rotating out of their secured positions, at least until the pins are withdrawn to permit rotation and removal of the inner body.

In the drawings, wherein like reference characters are used throughout to designate like parts:

FIG. 1 is a longitudinal sectional view of a safety relief valve constructed in accordance with the present invention, and with the closure member in seated position;

FIG. 2 is an elevational view of a rib for supporting the inner body of the valve within the outer body thereof, as seen along broken line 2—2 of FIG. 1;

FIG. 3 is a top plan view of the valve, as seen from broken line 3—3 of FIG. 1;

FIG. 4 is a longitudinal sectional view of the valve, as seen along broken line 4—4 of FIG. 3, but with the closure member shown in elevation and in unseated position; and FIG. 5 is a partial cross-sectional view of the valve, as seen along broken line 5—5 of FIG. 4.

With reference now to the details of the above-described drawings, the safety relief valve shown therein, and indicated in its entirety by the reference character 10, comprises an outer annular body 11 having a relief port 12 in one end and an outlet 13 in the other end coaxial with the relief port. The body is adapted to be mounted on and connected to an outlet from a vessel, such as a pipeline, by means of a flange 12A about the outer end of the port 12. Normally, the body 11 is so mounted on the vessel as to dispose the relief port 12 and outlet 13 vertically, so that surrounding persons or objects are protected from gas which is adapted to be exhausted through the outlet in a manner to be described to follow.

There is a seat 14 about the inner end of the flow passage through the relief port, and a closure member 15 is reciprocally mounted on an inner body 16 within the outer body 11 for movement into and out of seated positions on the seat along an axis coaxial with the seat and thus the relief port and outlet. More particularly, the inner annular body 16 is removably supported concentrically within the outer body 11 by ribs 17 which extend therefrom to seat upon the inner side of the outer body and thereby provide an annular flow passage 18 between the bodies.

The inner body 16 is moved through the outlet 13 into and out of seated position within the outer body, and, when the inner body is so seated, its lower end facing the relief port 12 is spaced from the seat 14 to provide an annular opening which connects the flow passage through the relief port 12 with the annular flow passage 18 between the inner and outer bodies. The upper end of the annular flow passage opens to the outlet 13, as illustrated, so that gas which is relieved from port 12 passes through the annular flow passage and out the outlet 13 for exhausting to the atmosphere.

The inner body 16 is recessed to provide a cylinder 19 which is open at its lower end and coaxial with the seat 14, and the closure member 15 is reciprocable within the open end of the cylinder 19 between the seated position of FIG. 1, in which it is across the annular opening connecting the flow passage through the relief port 12 and the annular flow passage 18, and the unseated position of FIG. 4, in which it is above such opening to provide full communication between the flow passages.

As in prior safety relief valves of this general type, closure member 15 is caused to move between opened and closed positions automatically in response to predetermined high and low pressure conditions of the gas to be relieved. Thus, for example, the closure member is caused to move to the open position of FIG. 4 in response to a predetermined high pressure of the gas, and then to move to the closed position of FIG. 1 in response to a predetermined low pressure of the gas. As will be described to follow, these high and low pressures are sensed by a high pressure or relief pilot $P_1$ and a low pressure or blowdown pilot $P_2$, respectively, both of which are mounted on the side of outer body 11, as shown in FIGS. 1 and 3.

The upper closed end of the inner body provides a head 20 for the cylinder, and the closure member 15 comprises a hollow piston 21 sealably slidable within O-rings 22 carried within recesses about the cylinder 19. A head 23 at the upper end of the piston defines a chamber 24 between it and cylinder head 20, and a head 25 on its lower end provides a seating surface 25A for engaging the inner end of seat 14 in the seated position of the closure member.

The closure member 15 and the high and low pressure pilots $P_1$ and $P_2$ are of substantially the same construction as those shown and described in connection with the safety relief valve of the aforementioned U.S. Pat. No. 2,759,488. Moreover, and as will be noted from the description to follow, they function in the same manner as their counterparts in such earlier patent, even though pilots are mounted on the valve 10 in a new and improved manner.

Thus, as will be apparent from FIG. 1, the cross-sectional area of the piston 21 is greater than the cross-sectional area of the inner diameter of the seat 14 engaged by closure member in its closed position. Consequently, when the pressure within the chamber 24 above the piston is equal to that within the relief port 12, the closure member will remain in seated position. On the other hand, when the pressure within the chamber 24 drops below that within relief port 12 to a sufficient extent, an unbalancing force will cause the closure member to move upwardly to the unseated position of FIG. 4.

In the closed position of the closure member shown in FIG. 1, the chamber 24 is connected with the relief port 12 by means of a port 26 through the lower head 25 of the piston, a sleeve 27 extending between the heads 23 and 25, and a port 28 through a valve member 29 slidable within the upper head. A spring 30 within the sleeve 27 urges the valve member upwardly to engage at its upper end with cylinder head 20, in which position the upper end of port 28 connects with the chamber 24, so that, as previously indicated, gas pressure from the relief port acts over the upper end of head 23 to hold the closure member closed.

However, upon a relatively rapid drop of the gas pressure within the chamber 24, the force due to gas pressure beneath the closure member will cause it to move upwardly to close the port 28 and thus prevent communication between the chamber 24 and the relief port 12. More particularly, and as described in the prior patent, the closure member 15 will continue upwardly under these conditions until it reaches its fully open position of FIG. 4, wherein the upper head of the piston engages the cylinder head 20.

This drop in the pressure within chamber 24 is caused by venting of the high pressure pilot $P_1$, which is connected to the pressure chamber by a conduit 31 connected to the outer end of a port 32 extending from the chamber 24 through one of the supporting ribs 17. Thus, each of the pilots is mounted on a header or manifold 33 releasably connected to a boss 34 on the side of body 11, and one branch 31A of the opposite end of the conduit 31 connects with a lower portion of the header to admit gas in the chamber 24 to the high pressure pilot $P_1$. As shown and described in the prior patent, the pilot is of such construction that it opens to vent the gas in the chamber 24 through V, and thus permit the closure member to move to open position, when such gas reaches a predetermined high value. Upon venting, the pilot $P_1$ will return to closed position so that, with the port 28 closed, the closure member will remain in open position.

A conduit 35 connects at one end with a probe 36 in the relief port 12 and at the other end with an upper portion of the header 33, so as to admit gas in the relief port to the low pressure pilot $P_2$. As also shown and described in the aforementioned prior patent, the low pressure pilot is of such construction as to open, when the gas pressure in the relief port reaches a predetermined low value, to communicate the conduit 35 with the chamber 24 through another branch of the conduit and thus gas pressure in the flow port to the chamber 24. Since the same pressure is beneath the closure member, the downward force on the closure member due to this pressure, together with the force due to the spring 30, will return the closure member to its seated position of FIG. 1.

Inasmuch as reference may be had to the aforementioned patent, and further since the broad aspects of the present invention contemplate other means for causing opening and closing of the closure member, further details of the construction of the closure member and the pilots as well as their interrelation is believed unnecessary. Thus, it is sufficient to note that, as compared with the valve and pilots of U.S. Pat. No. 2,759,488, wherein the header is built into the cylinder head, the valve 10 of the present invention provides a convenient side mounting for the pilots and the header 33 which enables the use of different sizes and shapes of headers.

Turning now to other details of the novel features of the overall valve 10, the outer body 11 is shown in FIGS. 1 and 4 to comprise an upper cylindrical portion 11A through which the outlet 13 is formed and a lower generally cylindrical portion 11B through which the flow port 12 is formed. The intermediate portion of the outer body 11 is made up of an upper conical portion 11C which is downwardly divergent on a relatively steep taper from the upper cylindrical portion 11A, and a lower conical portion 11D which is downwardly convergent on a relatively shallow taper from the lower end of the upper conical portion to connect at its lower end with the upper end of the lower cylindrical portion 11B.

The inner diameter of the upper end of the lower cylindrical portion 11B is enlarged at 37 to receive a metal ring 38 providing the seat 14. An O-ring 39 is carried in a recess in the outer diameter of the seat ring 38 to seal with respect to the enlarged diameter portion 37. The ring 38 may be moved into and out of its seated position of FIGS. 1 and 4 upon removal of the inner body 16 from within the outer body 11.

More particularly, the seat ring 38 is removably held in seated position by a plurality of locking segments 40 which are carried within an annular slot above portion 37 and held in seat retaining positions by means of pins 41 threadedly received within holes through bosses 42 disposed about the outer side of the outer body 11. Thus, as will be appreciated from FIGS. 4 and 5, the pins 41 may be moved radially inwardly into engaging positions between the side edges of adjacent pairs of locking segments so as to cause the side edges of such pairs to engage and thereby prevent their inward movement out of locking position. The pins are held in their inner position by means of locknuts 43, which may be released to permit retraction of the pins 41, at which time the segments 40 may be moved inwardly out of the annular slot and into positions permitting removal of the seat ring.

The outer side of the inner body 16 includes a lower conical portion 16A which is downwardly convergent on a relatively shallow taper, and an upper conical portion 16B which is upwardly convergent. The upper and lower conical portions of the outer side of the inner body 16 are connected by a downwardly convergent conical portion 16C which is on a much steeper taper than the lower conical portion 16A. The ribs 17 which extend radially outwardly from the outer side of the inner body 16 for supporting the inner body within the outer body include an upper portion having parallel opposite sides 17A and a lower portion having downwardly convergent opposite sides 17B, as best shown in FIG. 2.

As shown in each of FIGS. 1 and 4, the outer portion of the lower face of the lower head 25 of the piston 21 of the closure member 15, which provides seating surface 25A, is conical and converges downwardly toward a flat, circular central portion concentric with the relief port 12. More particularly, the taper of the conical portion of the lower side of the head 25 is the same as the taper of the lower conical portion 16A of the outer side of the inner body 16 and provides a smooth continuation thereof when the closure member 15 is in its open position. In the seated or closed position of the closure member 15, the seating surface 25A on this conical portion seats upon a correspondingly tapered surface 44 on the inner upper corner of the seat ring 38. The central portion of the lower side of head 25 includes a removable insert 45 retained within an annular recess on the lower side of head 25 by means of a plate 46 secured to the head by means of bolts 47.

The cross-sectional area of the annular opening connecting the relief port 12 with the annular flow passage 18 is at least as large as that of the flow passage through the relief port, and the cross-sectional area of the lower end of the annular flow passage is at least as large as that of the opening and constantly increases in a direction from its lower end connecting with the annular opening and its upper end connecting with the outlet 13.

As shown in FIGS. 1 and 4, the lower conical portion 16A of the inner body 16 and the lower conical portion 11D of the outer body 11 are on generally the same taper. Thus, since both are upwardly divergent, the cross-sectional area of the portion of the flow passage 18 between them will increase in a direction from the relief port toward the outlet.

As previously described, and as shown in FIG. 2, the sides 17B of the lower portion of the ribs 17 converge downwardly to their intersection at the lower ends of the ribs. Also, the intermediate conical portion 16C of the inner body is on a taper which is at least as steep, and in fact somewhat steeper, than the taper of the upper conical portion 11C of the outer body. More particularly, the tapers of the rib sides 17B and the body portion 11C and 16C are so selected as to provide a cross-sectional area of the annular flow passage 18 between them which continues to increase in a direction toward the outlet 13.

The upward convergence of the upper conical portion 16B of the inner body cooperates with the upper cylindrical portion 11A of the outer body to provide a constantly increasing cross-sectional area in the uppermost portion of the annular flow passage 18. As previously described, in this portion of the annular passage, the opposite sides 17A of the upper portion of the ribs 17 are parallel so as to have only small influence on the cross-sectional area. Thus, the upper portions of the bodies are of such construction as to permit insertion or removal of the inner body 16 with respect to the outer body without an overenlargement of the outer body.

As will also be apparent from the drawings, the flow passage 18 is free of sharp bends and major obstructions which might cause excessive pressure drops of the gas during exhaust through the valve 10. That is, the exhausting gas does not have to turn corners of greater than approximately 45° during travel from the relief port 12 to the outlet 13. Furthermore, all corners between successive sections of the flow passage 18 are rounded and streamlined. Also, of course, the exhaust of the gas is accomplished through an opening extending 360° about the circumference of the seat 14 about the relief port.

The ribs 17 on the outer body 16 are seated upon shoulders 48 formed at circumferentially spaced-apart locations about the lower end of the upper cylindrical portion 11A forming the outlet 13 from the outer body 11. More particularly, the outer sides of the ribs are undercut at the intersection of their upper and lower portions to provide a seating surface 48A for seating upon the shoulders 48 on the inner side of the outer body 11, and to space the outer downwardly and inwardly tapered sides 49 of the lower portions of the ribs 17 from the adjacent inner side of the outer body 11. Thus, only the seating surfaces and shoulders need be machined to tolerance.

As best shown in FIG. 3, the seats 48 are considerably wider than the ribs 17, and thus the seating surfaces 48A thereon, and lugs 50 are formed on the upper end of the upper cylindrical portion of the outer body 11 and arranged generally above the central portion of the seats 48. The inner diameters of the lugs are less than the outer diameter of the inner body to permit such body to be rotated to a position in which the ribs 17 are above and to one side of the lugs 50 and then lowered past the side of the lugs and onto the shoulders 48. The entire inner body may then be rotated to bring the upper end of each rib 17 beneath the shoulder 51 on the bottom surface of the lugs, as best shown in FIGS. 1 to 4, and thereby secure the inner body in seated position. Obviously, the inner body may be removed from within the outer body by a reversal of this process.

As shown, each of the shoulders 48 and 51 are parallel and perpendicular to the axis of body 11. Also, the shoulder 51, like the shoulder 48, is machined for closely engaging the top of a rib 17. The oppositely facing sides of the ribs and outer body are also preferably machined for close fit.

The inner body is held from rotation out of its secured position by means of a series of pins 52 which are mounted within holes 53 in the upper cylindrical portion of the outer body for movement into and out of holes 54 in the outer side of the upper portion of each rib 17. Thus, the holes 54 are so arranged as to be aligned with the inner ends of the pins 52 when the ribs 17 are rotated into their secured positions beneath the lugs 50, so that, with the pins 52 withdrawn, the ribs may be properly located and the pins extended inwardly into the holes 54 so as to retain the lugs against rotation. Preferably, the pins and holes 54 are provided with rather loose fitting threads so as to prevent the pins 52 from accidental withdrawal.

The top side of the inner body 16 above the cylinder head 20 is provided with a large eye 55 providing a lifting ring which may be used in raising and lowering the inner body from and to seated positions within the outer body. Preferably, the top side is also reinforced and strengthened by means of ribs 56 extending radially outwardly from the base of the eye 55 to each of the ribs 17.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A safety relief valve, comprising an outer annular body having a relief port through one end, an outlet at the other end, and an annular seat about the relief port, the portion of the inner side of the outer body intermediate the seat and the outlet being radially outwardly enlarged, an inner body having ribs extending outwardly therefrom, said inner body being removably insertable through the outlet of the outer body into a position therein in which the ribs are seated in the enlarged portion to support the inner body generally concentrically therein and thereby provide an annular flow passage between the inner body and the inner side of the outer body, one end of the inner body being spaced from the seat to provide an annular opening connecting the flow passage through the seat with the annular flow passage, means on the inner and outer bodies for releasably securing said inner body in said position, the inner body having a cylinder therein opening to said one end of the inner body and closed at the other end, and a closure member including a piston slidable within the cylinder for reciprocation within the open end of the cylinder between a position seated on said seat to close communication between the flow passage through the seat and the annular flow passage and a position spaced from the seat to open communication therebetween, said securing means comprising lugs on the inner side of the enlarged portion of the body having bearing surfaces facing toward the relief port, and bearing surfaces on the ribs facing toward the outlet and on substantially the same level as the bearing surfaces on the lugs when the ribs are in their seated positions, said lugs being circumferentially spaced apart a distance greater than the width of the ribs, to permit said ribs to be passed between said lugs as the inner body is inserted into said enlarged portion and then rotated into positions in which the bearing surfaces on said ribs are beneath the bearing surfaces on the lugs.

2. A safety relief valve of the character defined in claim 1, wherein the ribs have additional bearing surfaces facing toward the relief port in their seated positions, there are annular shoulders about said enlarged portion and facing toward the outlet for engaging said additional bearing surfaces on the ribs in their seated positions, and said first-mentioned and additional bearing surfaces on the ribs lie in planes perpendicular to said annular flow passage when so seated.

3. A safety relief valve of the character defined in claim 1, including pins mounted on the outer body for radial movement into and out of the enlarged portion, and holes in the ribs to receive the inner ends of the pins when the ribs are in their secured positions.

4. A safety relief valve of the character defined in claim 1, wherein each of said outer body and one of said ribs has ports therein adapted to be aligned with one another when the ribs are seated so as to communicate the chamber with the exterior of the valve.

5. A safety relief valve of the character defined in claim 1, wherein said seat comprises a ring, and including means for releasably holding said ring in a seated position within said relief port.

6. A safety relief valve of the character defined in claim 1, including a lifting ring on the other end of the inner body.

7. A safety relief valve, comprising an outer annular body having a relief port through one end, an outlet at the other end, and an annular seat about the relief port, the portion of the inner side of the outer body intermediate the seat and the outlet being radially outwardly enlarged, an inner body, means supporting the inner body generally concentrically within the enlarged portion and with one end thereof spaced from the seat to provide an annular flow passage between the inner body and the inner side of the outer body extending from said one end to said outlet and having a cross-sectional area which is at least as large as the cross-sectional area of the flow passage through the seat and which increases substantially constantly in a direction toward the outlet, the portions of the oppositely facing inner body and inner side of the outer body adjacent the smaller end of said annular flow passage being conical and generally parallel to one another, and a closure member having a lower conical portion about its outer side and mounted on the inner body for reciprocation between a position seated on said seat to close communication between the flow passage through the seat and the annular flow passage and a position spaced from the seat in which said conical portion of the closure member forms a substantial continuation of the conical portion of the inner body and provides an annular opening connecting the flow passage through the seat with the annular flow passage which has a cross-sectional area at least as large as the flow passage through the seat and no larger than the cross-sectional area of the smaller end of the annular flow passage, the conical portion of the inner side of the outer body adjacent the smaller end of said annular flow passage forming a substantial continuation of the inner side of the seat.

8. A safety relief valve of the character defined in claim 7, wherein said supporting means comprises ribs on the inner body extending outwardly therefrom for seating on the outer body, so as to permit said inner body to be moved through the outlet, and means on the inner and outer bodies for releasably securing said inner body in supported position.

* * * * *